ated Mar. 21, 1916.

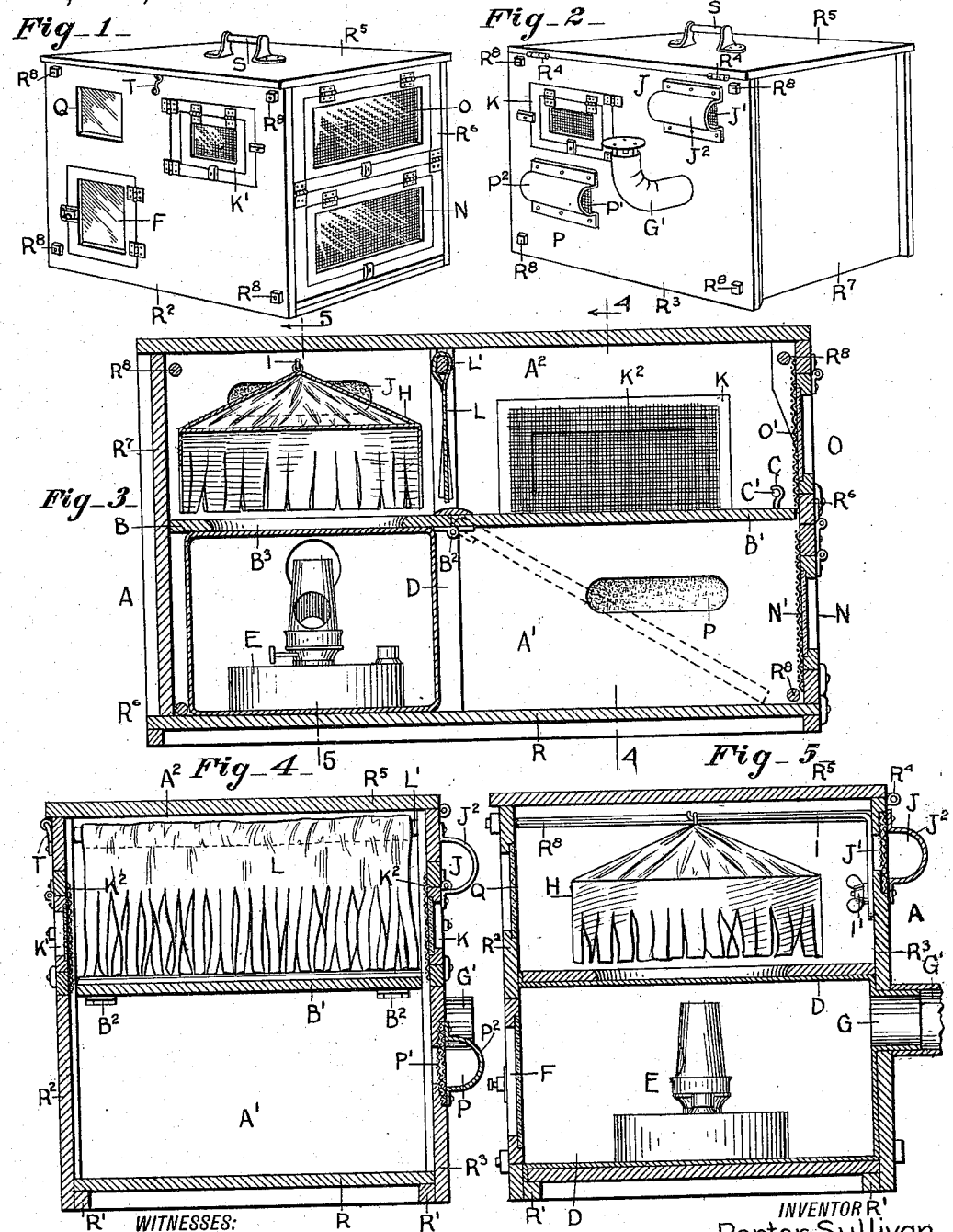

UNITED STATES PATENT OFFICE.

PORTER SULLIVAN, OF WAVERLY, ILLINOIS.

BROODER.

1,176,496.

Specification of Letters Patent.   Patented Mar. 21, 1916.

Application filed May 11, 1915.   Serial No. 27,329.

*To all whom it may concern:*

Be it known that I, PORTER SULLIVAN, a citizen of the United States, and a resident of Waverly, in the county of Morgan and State of Illinois, have invented a new and Improved Brooder, of which the following is a full, clear, and exact description.

The object of the invention is to provide a new and improved brooder arranged to permit convenient collapsing and storing during the winter, and when set up and used to insure the production of a uniform heat within the brooder for keeping the chicks warm, to prevent the chicks from unduly crowding and smothering one another, to provide a runway for the same, and to prevent obnoxious gases from the lamp from reaching the chicks.

In order to accomplish the desired result, use is made of a box provided with a floor dividing the box into an upper and a lower compartment, a lamp casing of sheet metal fitted into the rear portion of the lower compartment and adapted to contain a lamp, the top of the casing fitting against the under side of a corresponding portion of the floor and this portion of the floor having an opening forming with the top of the lamp casing a receptacle or recess for the reception of dirt and a hood suspended in the upper compartment above the dirt receptacle.

A practical embodiment of the invention is represented in the accompanying drawings forming a part of this specification, in which similar characters of reference indicate corresponding parts in all the views.

Figure 1 is a front perspective view of the brooder; Fig. 2 is a rear perspective view of the same; Fig. 3 is a sectional side elevation of the same; Fig. 4 is a cross section of the same on the line 4—4 of Fig. 3; and Fig. 5 is a similar view of the same on the line 5—5 of Fig. 3.

The brooder is in the form of a box A made collapsible, as hereinafter more fully explained, and within the box A is arranged a floor formed of a fixed rear section B and a front setcion B' connected at its rear end by hinges B² to the front end of the rear floor section B. The front floor section B' is adapted to be swung downward into an inclined position, as shown in dotted lines in Fig. 3, at the time the chicks have grown to considerable size, but while the chicks are young the floor section B' is held in horizontal position and for this purpose is provided at its free end with hooks C engaging pins C' attached to the sides of the box A. The floor sections B, B' divide the interior of the box A into a lower and upper compartment A' and A², and within the rear portion of the lower compartment A' is arranged a sheet metal lamp casing D containing a lamp E of any approved construction. The top of the lamp casing D fits against the under side of the fixed floor section B and this floor section B is provided with an opening B³ which forms with the top of the lamp casing D a receptacle for containing dirt or like loose material. The upper compartment is adapted to contain the chicks and the chicks can run on the floor formed of the sections B, B' and on the dirt contained in the dirt receptacle, it being understood that the dirt is heated by contact with the top of the lamp casing D and sufficient heat is radiated from the same to heat the upper compartment A². One side of the lamp casing D is provided with a door F and from the other side extends a nipple G through an opening in the side of the box A to connect with a chimney flue G' for carrying off the smoke and gases emanating from the burning lamp E.

It will be noticed that by the arrangement described the obnoxious gases incident to the burning lamp E cannot pass into the upper compartment A² containing the brood.

A hood H is suspended from a bracket I within the rear portion of the upper compartment A², the bracket I being removably attached by a suitable screw I' to one side of the box A, and the hood H is made circular and extends directly above the dirt receptacle B³. The hood H is preferably of a fabric material stretched on a suitable metallic frame with the lower portions of the sides cut into strips to allow the chicks to readily pass under the hood or out from under the same. One side of the box A at the rear portion of the upper compartment A² is provided with a suitable ventilator J to ventilate the said rear portion of the upper compartment A². The front portion of the upper compartment A² is provided with windows K, K' adapted to be opened and having their openings covered by wire screens K² to provide ventilators for the front portion of the upper compartment A².

The front and rear portions of the upper compartment A² are preferably separated by a curtain L hung on a cross bar L' attached to the sides of the box A, and the said curtain L has its lower portion cut into strips which reach to within a short distance of the floor to allow the chicks to readily pass from one portion of the upper compartment A² to the other. The front of the box A is provided with lower and upper doors N and O, of which the door N is opened whenever the floor section B' is swung downward into lowermost position to allow the chicks to pass down the floor section B' and out through the door N into the surrounding neighborhood. A ventilator P is also arranged on one side of the box leading to the front portion of the lower compartment A' to ventilate the same. An observation window Q is arranged on one side of the casing opposite the hood H to permit of viewing the chicks contained in the rear portion of the upper compartment A².

The box A is preferably of a knockdown type and for this purpose consists of a bottom R resting on cleats R' attached to the inner face of the sides R², R³, of which the side R³ is connected at its upper end by hinges R⁴ with the cover R⁵. The front R⁶ and the back R⁷ rest on the bottom R and bolts R⁸ extend transversely through the sides R², R³ to securely fasten the parts together. On removing the bolts R⁸ the sides can be removed as well as the front, the back and the bottom, and the cover R⁵ folded onto the side R³. The rear section B of the partition is supported on top of the lamp casing D, which latter can be readily removed when the box is taken apart.

Each of the ventilators J and P is preferably in the form of a wire screen J', P' stretched over openings in the side R⁴ and covered by half-round shields J² open at the ends to prevent direct draft but to allow the foul air to pass out of the compartments A², A' and fresh air to pass into the same. The front R⁶ is preferably made in two parts hinged together, as plainly shown in Fig. 1, and the upper front section is pivoted on the upper front rod R⁸. Each of the windows O and N has its opening covered by a screen O', N' to allow air to pass into the compartments A', A² on opening the windows to prevent the chicks from falling out of the windows at the time the latter are open. When the floor section B' is swung downward into inclined position, as shown in dotted lines in Fig. 3, then the lower section of the front R⁶ is swung open to allow the chicks to run to the outside. It is understood that only after the chicks have reached certain growth they are permitted to run to the outside, as above explained.

In order to permit of conveniently carrying the brooder about, the top R⁵ is provided with a handle S, and in order to lock the cover R⁵ to the side R², use is made of a fastening device T such as a hook or staple, as indicated in Figs. 1 and 4.

Having thus described my invention, I claim as new and desire to secure by Letters Patent:

1. A brooder, comprising a box provided with a floor dividing the box into an upper and a lower compartment, the floor having a fixed section and a section hinged on the fixed section to allow of swinging the hinged section downward into an inclined position, the fixed floor section having an opening, a lamp casing in the lower compartment below the fixed floor section and adapted to house a lamp, the opening in the fixed floor section being directly above the lamp casing, the top of said lamp casing fitting against the under side of the fixed floor section, a door for the lamp casing, and a chimney leading from the said lamp casing.

2. A brooder, comprising a box provided with a floor dividing the box into an upper and a lower compartment, a lamp casing in the lower compartment and provided with a door and a chimney, a portion of the floor being cut out over the top of the lamp casing to allow of filling the cut-out portion with dirt.

3. A brooder, comprising a box provided with a floor dividing the box into an upper and a lower compartment, a lamp casing in the lower compartment and provided with a door and a chimney, a portion of the floor being cut out over the top of the lamp casing to allow of filling the cut-out portion with dirt, and a hood suspended in the upper compartment above the dirt-filled cut-out portion.

4. A brooder, comprising a box provided with a floor dividing the box into an upper and a lower compartment, a lamp casing in the lower compartment and provided with a door and a chimney, a portion of the floor being cut out over the top of the lamp casing to allow of filling the cut-out portion with dirt, and a hood suspended in the upper compartment above the said dirt filled cut-out portion, the sides of the hood being provided with flaps, the lower ends of which are above the floor.

5. A brooder, comprising a box provided with a floor dividing the box into an upper and a lower compartment, a lamp casing in the lower compartment and provided with a door and chimney, a portion of the floor being cut out over the top of the lamp casing to allow of filling the cut-out portion with dirt, a hood suspended in the upper compartment above the said dirt-filled cut-out portion, and a ventilator for the upper compartment adjacent the hood.

6. A brooder, comprising a box provided with a floor dividing the box into an upper and a lower compartment, a lamp casing in the lower compartment and provided with a door and a chimney, a portion of the floor being cut out over the top of the lamp casing to allow of filling the cut-out portion with dirt, a bracket held in the said upper compartment, and a hood suspended from the said bracket directly above the said dirt-filled cut-out portion, the lower edge of the hood being above the said floor.

7. A brooder, comprising a box, a floor made in front and rear sections and dividing the box into an upper and a lower compartment, the rear floor section being fixed and the front section being hinged to the rear section to allow of swinging the front section downwardly into an inclined position means for normally holding the front floor section in horizontal position, a lamp casing adapted to contain a lamp and fitted into the rear portion of the lower compartment, the top of the casing fitting against the under side of the said fixed floor section and the latter having an opening forming with the said casing top a receptacle for the reception of dirt, a hood suspended in the rear of the upper compartment above the said receptacle, and a curtain suspended in the upper compartment between the front and rear portions thereof.

8. A brooder, comprising a box, a floor in the said box dividing the interior of the box into an upper and a lower compartment, a sheet metal lamp casing in the rear portion of the lower compartment and having its top fitting against the under side of the rear portion of the said floor, the said rear floor portion having an opening forming with the said casing top a receptacle for dirt, a hood suspended in the upper compartment above the said receptacle, and a curtain suspended in the upper compartment to divide the latter into a front runway and a rear heated portion.

9. A brooder, comprising a box, a floor in the said box dividing the interior of the box into an upper and a lower compartment, a sheet metal lamp casing in the rear portion of the lower compartment and having its top fitting against the under side of the rear portion of said floor, the said rear floor portion having an opening forming with the said casing top a receptacle for dirt, a hood suspended in the upper compartment above the said receptacle, a curtain suspended in the upper compartment to divide the latter into a front runway and a rear heated portion, and a chimney leading from the said lamp casing through one side of the box to the outside thereof.

10. A brooder, comprising a box, a floor in the said box dividing the interior of the box into an upper and a lower compartment, a sheet metal lamp casing in the rear portion of the lower compartment and having its top fitting against the under side of the rear portion of the said floor, the said rear floor portion having an opening forming with the said casing top a receptacle for dirt, a hood suspended in the upper compartment above the said receptacle, a curtain suspended in the upper compartment to divide the latter into a front runway and a rear heated portion, a chimney leading from the said lamp casing through one side of the box to the outside thereof, and a ventilator on one side of the box and connected with the said heated portion of the upper compartment.

In testimony whereof I have signed my name to this specification in the presence of two subscribing witnesses.

PORTER SULLIVAN.

Witnesses:
C. F. WEMPLE,
P. W. WEMPLE.

Copies of this patent may be obtained for five cents each, by addressing the "Commissioner of Patents. Washington, D. C."